United States Patent
Hirose (10) Patent No.: US 10,745,316 B2
(45) Date of Patent: *Aug. 18, 2020

(54) SEALING GLASS

(71) Applicant: Nippon Electric Glass Co., Ltd., Shiga (JP)

(72) Inventor: Masayuki Hirose, Shiga (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/069,253

(22) PCT Filed: Jan. 5, 2017

(86) PCT No.: PCT/JP2017/000164
§ 371 (c)(1),
(2) Date: Jul. 11, 2018

(87) PCT Pub. No.: WO2017/122577
PCT Pub. Date: Jul. 20, 2017

(65) Prior Publication Data
US 2019/0023605 A1   Jan. 24, 2019

(30) Foreign Application Priority Data

Jan. 12, 2016 (JP) .................. 2016-003223

(51) Int. Cl.
*C03C 8/24* (2006.01)
*C03C 8/06* (2006.01)
(Continued)

(52) U.S. Cl.
CPC ............. *C03C 8/06* (2013.01); *C03C 3/091* (2013.01); *C03C 3/118* (2013.01); *C03C 8/02* (2013.01);
(Continued)

(58) Field of Classification Search
CPC ............. C03C 8/22; C03C 8/24; C03C 8/06
See application file for complete search history.

(56) References Cited

U.S. PATENT DOCUMENTS 3,723,790 A * 3/1973 Dumbaugh, Jr. ....... C03C 3/085
                                                    313/316
4,608,351 A * 8/1986 Boudot .................. C03C 3/105
                                                    501/61
(Continued)

FOREIGN PATENT DOCUMENTS

JP     56-145132        11/1981
JP     03183638 A  *   8/1991  ............... C03C 8/02
(Continued)

OTHER PUBLICATIONS

International Search Report dated Apr. 11, 2017 in International Application No. PCT/JP2017/000164.
(Continued)

*Primary Examiner* — Karl E Group
(74) *Attorney, Agent, or Firm* — Wenderoth, Lind & Ponack, L.L.P.

(57) ABSTRACT

A glass for sealing of the present invention includes as a glass composition, in terms of mol %, 60% to 80% of $SiO_2$, 8% to 5.8% of $B_2O_3$, 12% to 18.7% or $Li_2O+Na_2O+K_2O$, and 2% to 12% of $MgO+CaO+SrO+BaO$, and has a molar ratio $SiO_2/B_2O_3$ of 14 or more.

7 Claims, 4 Drawing Sheets

(51) Int. Cl.
*C03C 27/02* (2006.01)
*C03C 8/02* (2006.01)
*C03C 3/091* (2006.01)
*H01R 9/16* (2006.01)
*C03C 3/118* (2006.01)
*H01R 13/52* (2006.01)

(52) U.S. Cl.
CPC ............... *C03C 8/24* (2013.01); *C03C 27/02* (2013.01); *H01R 9/16* (2013.01); *C03C 2205/00* (2013.01); *H01R 13/521* (2013.01); *H01R 13/5216* (2013.01)

(56) References Cited

U.S. PATENT DOCUMENTS

| | | | | | |
|---|---|---|---|---|---|
| 4,952,531 | A | * | 8/1990 | Cherukuri | C03C 8/24 257/E23.193 |
| 6,291,092 | B1 | * | 9/2001 | Kohli | C03C 8/04 429/495 |
| 7,189,470 | B2 | * | 3/2007 | Cortright | C03C 8/02 429/495 |
| 2006/0160690 | A1 | | 7/2006 | Cortright et al. | |
| 2019/0010082 | A1 | * | 1/2019 | Nishikawa | C03C 8/02 |

FOREIGN PATENT DOCUMENTS

| | | | | |
|---|---|---|---|---|
| JP | 2008-527680 | | | 7/2008 |
| JP | 2012-74268 | | | 4/2012 |
| JP | 2012074268 | A | * | 4/2012 |
| JP | 2014-175069 | | | 9/2014 |
| JP | 2014-241258 | | | 12/2014 |
| JP | 2015-64928 | | | 4/2015 |
| JP | 2015-069732 | | | 4/2015 |
| SU | 581098 | A | * | 12/1977 |
| SU | 977419 | A | * | 11/1982 |
| SU | 174748 | A1 | * | 7/1992 |

OTHER PUBLICATIONS

International Preliminary Report on Patentability dated Jul. 17, 2018 in International Application No. PCT/JP2017/000164.

* cited by examiner

SEALING GLASS

TECHNICAL FIELD

The present invention relates to a glass for sealing, and more particularly, to a glass for sealing suitable for sealing a hermetic terminal of a refrigerant compressor to be used in a refrigerator and the like.

BACKGROUND ART

A hermetic terminal of a refrigerant compressor is produced by sealing a metal stem and a metal pin to each other with a glass for sealing in order to maintain airtightness.

The glass for sealing is produced and used as described below. First, a glass raw material is melted and formed, and the glass after forming is pulverized in a ball mill and then allowed to pass through a predetermined sieve to provide fine powder. Next, granules are produced by mixing the fine powder with a binder and granulating the mixture. After that, the granules are subjected to tablet molding to produce a green compact having a through-hole, and the green compact is increased in temperature from normal temperature, to thereby decompose and remove the binder and sinter the green compact. Next, a metal pin is inserted in the through-hole of the resultant sintered compact, and the sintered compact is in turn housed in a circular metal stem, followed by being loaded into an electric furnace, and fired at a temperature higher than a glass transition point under a nitrogen atmosphere, to thereby seal the metal pin and the metal stem to each other. As a result, the glass for sealing is in a state of being compressed fey the metal stem. The metal stem generally has a thermal expansion coefficient of from $140 \times 10^{-7}/°C$. to $150 \times 10^{-7}/°C$. The metal pin generally has a thermal expansion coefficient of from $100 \times 10^{-7}/°C$. to $110 \times 10^{-7}/°C$. The glass for sealing generally has a thermal expansion coefficient of from $90 \times 10^{-7}/°C$. to $100 \times 10^{-7}/°C$.

Figure 1A:
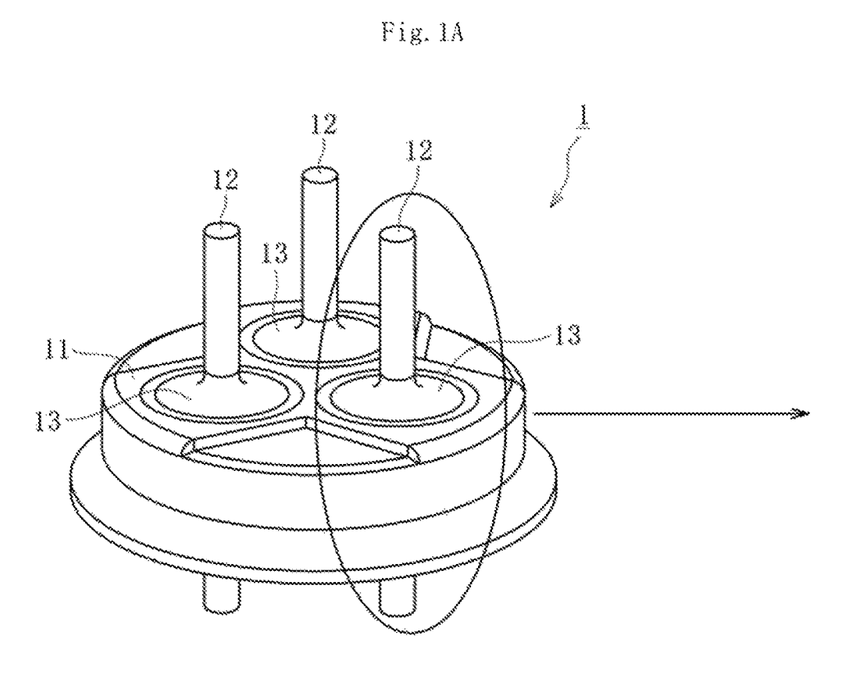
FIG. 1A is a conceptual diagram for illustrating a hermetic terminal.
Figure 1B:
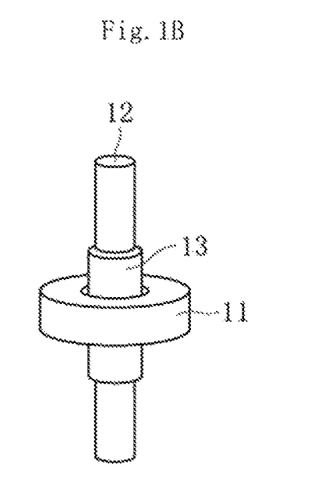
FIG. 1B is a conceptual diagram for illustrating a state of a metal stem, a metal pin, and a glass for sealing before firing.
Figure 1C:
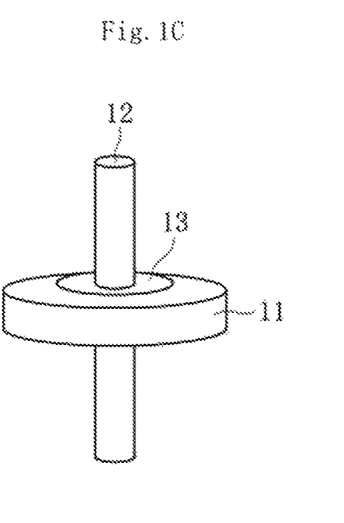
FIG. 1C is a conceptual diagram for illustrating a state of the metal stem, the metal pin, and the glass for sealing after the firing.

FIG. 1A is a conceptual diagram for illustrating a hermetic terminal 1. The hermetic terminal 1 comprises a metal stem 11, a metal pin 12, and a glass 13 for sealing. FIG. 1B is a conceptual diagram for illustrating, with respect to a main portion of the hermetic terminal 1 of FIG. 1A, a state of the metal stem 11, the metal pin 12, and the glass 13 for sealing before firing. FIG. 1C is a conceptual diagram for illustrating, with respect to the main portion of the hermetic terminal 1 of FIG. 1A, a state of the metal stem 11, the metal pin 12, and the glass 13 for sealing after the firing.

CITATION LIST

Patent Literature 1: JP 2014-175069 A
Patent Literature 2: JP 2015-064928 A
Patent Literature 3: JP 2015-069732 A

SUMMARY OF INVENTION

Technical Problem

The metal stem and the glass for sealing are bonded at a temperature higher than the glass transition point, and then cooled to room temperature. During the cooling, a stress is generated owing to a difference in shrinkage between the metal stem and the glass for sealing. The difference in shrinkage is not relieved owing to deformation of the glass for sealing, and most of the difference remains as the stress between the metal stem and the glass for sealing. In addition, when the stress is not appropriate, cracks occur in the glass for sealing.

Specifically in the course of cooling the metal stem and the glass for sealing after their bonding, the glass for sealing shrinks at a temperature around the glass transition point. When the glass for sealing excessively shrinks, that is, abnormal shrinkage occurs, the glass for sealing is temporarily subjected to a large tensile from the metal stem. The tensile stress has a risk of causing cracks at an interface between the metal stem and the glass for sealing, and causing hermetic leakage of a refrigerant at the time of incorporation in a refrigerator and the like. In addition, when the glass for sealing proceeds with cooling after having been temporarily subjected to the tensile stress from the metal stem owing to its shrinkage, a difference in expansion between the metal stem and the glass for sealing is reversed, and finally the glass for sealing is subjected to a compression stress from the metal stem. When the compression stress is insufficient, cracks are liable to occur in the glass for sealing owing to external factors, such as dropping and an impact.

The present invention has been made in view of the above-mentioned circumstances, and a technical object of the present invention is to devise a glass for sealing in which abnormal shrinkage is less liable to occur at a temperature around a glass transition point during cooling, and which is appropriately compressed by a metal stem after the cooling, to thereby increase the hermetic reliability of a hermetic terminal and the like.

Solution to Problem

The inventor of the present invention has repeated various experiments, and as a result, has found that the above-mentioned technical object can be achieved by restricting the content of an alkali metal oxide ($Li_2O$, $Na_2O$, and $K_2O$) and the content of an alkaline earth metal oxide (MgO, CaO, SrO, and BaO) within predetermined ranges while reducing a content ratio between $SiO_2$ and $B_2O_3$. Thus, the finding is proposed as the present invention. That is, a glass for sealing according to one embodiment of the present invention comprises as a glass composition, in terms of mol %, 60% to 80% of $SiO_2$, 0% to 5.8% of $B_2O_3$, 12% to 18.7% of $Li_2O+Na_2O+K_2O$, and 2% to 12% of $MgO+CaO+SrO+BaO$, and has a molar ratio $SiO_2/B_2O_3$ of 14 or more. Herein, the content of "$Li_2O+Na_2O+K_2O$" refers to the total content of $Li_2O$, $Na_2O$, and $K_2O$. The content of "$MgO+CaO+SrO+BaO$" refers to the total content of MgO, CaO, SrO, and BaO. The mass ratio "$SiO_2/B_2O_3$" refers to a value obtained by dividing the content of $SiO_2$ by the content of $B_2O_3$.

The glass for sealing according to the embodiment of the present invention has a content of $B_2O_3$ of 5.8 mol % or less, a content of $Li_2O+Na_2O+K_2O$ of 18.7 mol % or less, and a content of $MgO+CaO+SrO+BaO$ of 12% mol % or less, and has a molar ratio $SiO_2/B_2O_3$ of 14 or more. With this, the thermal expansion curve of the glass has a small inflection at a temperature around a glass transition point, and abnormal shrinkage is less liable to occur in the glass during cooling. As a result, a difference in thermal expansion between the glass for sealing and a metal stem at a temperature around the glass transition point is reduced, and hence cracks are less liable to occur in the glass for sealing at the time of incorporation in a refrigerator and the like.

Further, the glass for sealing according to the embodiment of the present invention has a content of $Li_2O+Na_2O+K_2O$ of 12 mol % or more and a content of $MgO+CaO+SrO+BaO$ of 2 mol % or more. With this, the viscosity of the glass is reduced, and hence a bonding temperature can be reduced.

Secondly, it is preferred that the glass for sealing according to the embodiment of the present invention have a content of MgO+CaO+SrO+BaO of from 4 mol % to 10 mol %.

Thirdly, it is preferred that the glass for sealing according to the embodiment of the present invention have a content of $Li_2O+Na_2O+K_2O$ of 18 mol % or less and have a molar ratio CaO/(MgO+CaO+SrO+BaO) of more than 0.2. With this, water resistance is remarkably increased, and bubbles are less liable to be generated through firing of granules. Herein, the molar ratio "CaO/(MgO+CaO+SrO+BaO)" refers to a value obtained by dividing the content of CaO by the total content of MgO, CaO, SrO, and BaO.

Fourthly, it is preferred that the glass for sealing according to the embodiment of the present invention have a content of $Li_2O+Na_2O+K_2O+MgO+CaO+SrO+BaO$ of 25 mol % or less.

Herein, the content of "$Li_2O+Na_2O+K_2O+MgO+CaO+SrO+BaO$" refers to the total content of $Li_2O$, $Na_2O$, $K_2O$, MgO, CaO, SrO, and BaO.

Fifthly, it is preferred that the glass for sealing according to the embodiment of the present invention further comprise 0.1 mol % to 2 mol % of F in the glass composition.

Sixthly, it is preferred that the glass for sealing according to the embodiment of the present invention have a granular form.

Seventhly, it is preferred that the glass for sealing according to the embodiment of the present invention comprise a sintered compact.

Eighthly, it is preferred that the glass for sealing according to the embodiment of the present invention be used for sealing a hermetic terminal.

DESCRIPTION OF EMBODIMENTS

A glass for sealing of the present invention comprises as a glass composition, in terms of mol %, 60% to 80% of $SiO_2$, 0% to 5.8% of $B_2O_3$, 12% to 18.7% of $Li_2O+Na_2O+K_2O$, and 2% to 12% of MgO+CaO+SrO+BaO, and has a molar ratio $SiO_2/B_2O_3$ of 14 or more. The reasons why the contents of the components are limited as described above are described below. In the description of the contents of the components, the expression "%" means "mol %".

$SiO_2$ is a main component for forming a glass skeleton, and the content of $SiO_2$ is from 60% to 80%, preferably from 65% to 75%, more preferably from 68% to 72%. When the content of $SiO_2$ is too small, there is a risk in that, thermal expansion coefficient is increased improperly. In addition, water resistance is liable to be reduced. Meanwhile, when the content of $SiO_2$ is too large, a bonding temperature is liable to be increased.

$B_2O_3$ is a component which increases meltability and reduces the bonding temperature, and is also a component which increases the water resistance. However, $B_2O_3$ is a component which encourages abnormal shrinkage at a temperature around a glass transition point during cooling. The content of $B_2O_3$ is from 0% to 5.8%, preferably more than 0% to 5.3%, more preferably from 1% to 4.8%, particularly preferably from 2% to 3.5%. When the content of $B_2O_3$ is too small, the bonding temperature is liable to be increased, and the water resistance is liable to be reduced. When, the water resistance is reduced, glass powder is liable to be affected by water in a granulation step, and bubbles are liable to be generated through firing of granules. Meanwhile, when the content of $B_2O_3$ is too large, a thermal expansion curve has a large inflection at a temperature around the glass transition point, abnormal shrinkage occurs in the glass during cooling, and the glass is liable to be temporarily subjected to a large tensile stress from a metal stem.

The molar ratio $SiO_2/B_2O_3$ is 14 or more, preferably 17 or more, more preferably 20 or more, still more preferably from 23 to 250. When the molar ratio $SiO_2/B_2O_3$ is too small, the thermal expansion curve has a large inflection at a temperature around the glass transition point, abnormal shrinkage occurs in the glass during the cooling, and the glass is liable to be temporarily subjected to a large tensile stress from the metal stem. Meanwhile, when the molar ratio $SiO_2/B_2O_3$ is too large, a viscosity at high temperature is increased, and fluidity is liable to be insufficient in a sealing step. In addition, the water resistance is liable to be reduced.

An alkali metal oxide ($Li_2O$, $Na_2$, and $K_2O$) is a component which increases the meltability and reduces the bonding temperature, but is a component which encourages abnormal shrinkage at a temperature around the glass transition point during the cooling. The alkali metal oxide is also a component which reduces the water resistance. The content of $Li_2O+Na_2+K_2O$ is from 12% to 18.7%, preferably from 12.5% to 18%, more preferably from 13% to 17%, still more preferably from 14% to 16%. The content of $Li_2O$ is preferably from 0% to 10%, more preferably from 1% to 7%, still more preferably from 2% to 6%, particularly preferably from 2.5% to 4%. The content of $Na_2O$ is preferably from 1% to 15%, more preferably from 2% to 12%, still more preferably from 3% to 10%, particularly preferably from 4% to 7%. The content of $K_2O$ is preferably from 1% to 15%, more preferably from 2% to 12%, still more preferably from 3% to 10%, particularly preferably from 4% to 7%. When the content of the alkali metal oxide is too small, the bonding temperature is increased, and hence a residual stress generated after the cooling is increased, with the result that the probability of a hermetic leakage is liable to be increased. Meanwhile, when the content of the alkali metal oxide is too large, abnormal shrinkage occurs in the glass during the cooling, and the glass is liable to be temporarily subjected to a large tensile stress from the metal stem. In addition, the water resistance is liable to be reduced.

An alkaline earth metal oxide (MgO, CaO, SrO, and BaO) is a component which reduces the bonding temperature. The content of MgO+CaO+SrO+BaO is from 2% to 12%, preferably from 4I to 11%, more preferably from 5% to 9%, particularly preferably from 6% to 8%. The content of MgO is preferably from 0% to 5%, more preferably from 0% to 3%, still more preferably from 0% to 1%. The content of CaO is preferably from 0% to 10%, more preferably from 1% to 8%, still more preferably from 3% to 7%. The content of SrO is preferably from 0% to 5%, more preferably from 0% to 3%, still more preferably from 0% to 1%. The content of BaO is preferably from 0% to 7%, more preferably from 1% to 5%, still more preferably from 2% to 4%. When the content of the alkaline earth metal oxide is too small, the bonding temperature is increased, and hence a residual stress generated after the cooling is increased, with the result that the probability of the hermetic leakage is liable to be increased. Meanwhile, when the content of the alkaline earth metal oxide is too large, the thermal expansion curve has a large inflection at a temperature around the glass transition point, abnormal shrinkage occurs in the glass during the cooling, and the glass is liable to be temporarily subjected to a large tensile stress from the metal stem.

The molar ratio CaO/(MgO+CaO+SrO+BaO) is preferably restricted to 0.2 or more (desirably 0.3 or more, particularly desirably 0.4 or more) while the content of $Li_2O+Na_2O+K_2O$ is restricted to 18% or less. When the content of $Li_2O+Na_2O+K_2O$ is too large, the water resistance is reduced, and bubbles are liable to be generated through the firing of the granules. In addition, when the molar ratio CaO/(MgO+CaO+SrO+BaO) is too small, the water resistance is reduced, and bubbles are liable to be generated through the firing of the granules. Out of the alkaline earth metal oxides, CaO has a high effect of increasing the water resistance.

The content of $Li_2O+Na_2O+K_2O+MgO+CaO+SrO+BaO$ is preferably 25% or less or 24% or less, particularly preferably 23% or less. When the content of $Li_2O+Na_2O+K_2O+MgO+CaO+SrO+BaO$ is too large, the thermal expansion curve has a large inflection at a temperature around the glass transition point, abnormal shrinkage occurs in the glass during the cooling, and the glass is liable to be temporarily subjected to a large tensile stress from the metal stem.

Other than the above-mentioned components, for example, the following components may be introduced.

$Al_2O_3$ is a component which increases the water resistance. The content of $Al_2O_3$ is preferably from 0% to 8%, more preferably from 1% to 6%, still more preferably from 2% to 4%. When the content of $Al_2O_3$ is too small, the water resistance is liable to be reduced. Meanwhile, when the content of $Al_2O_3$ is too large, the bonding temperature is liable to be increased.

$TiO_2$ and $ZrO_2$ are each a component which increases the water resistance. The content of each of $TiO_2$ and $ZrO_2$ is preferably from 0% to 4%, more preferably from 0% to 2%, still more preferably from 0.1% to 1%. When the contents of $TiO_2$ and $ZrO_2$ are too small, the water resistance is liable to be reduced. Meanwhile, when the contents of $TiO_2$ and $ZrO_2$ are too large, the bonding temperature is liable to be increased.

F is a component which reduces abnormal shrinkage at a temperature around the glass transition point while reducing the viscosity at high temperature. The content of F is preferably from 0% to 2%, more preferably from 0.1% to 1%. When the content of F is too large, an environmental load is liable to be increased.

Other than the above-mentioned components, for example, $Cl_2$, $La_2O_3$, $MnO_2$, $Cr_2O_3$, $Fe_2O_3$, $Co_2O_3$, and the like may be introduced at respective contents of from 0.1% to 3% unless the effects of the present invention are impaired improperly.

The glass for sealing of the present invention has a thermal expansion coefficient in a temperature range of from 30° C. to 380° C. of preferably from $60\times10^{-7}$/° C., to $130\times10^{-7}$/° C., more preferably from $80\times10^{-7}$/° C. to $110\times10^{-7}$/° C., still more preferably from $85\times10^{-7}$/° C. to $105\times10^{-7}$/° C., particularly preferably from $90\times10^{-7}$/° C. to $100\times10^{-7}$/° C. When the thermal expansion coefficient is too high, after the production of a hermetic terminal, a state in which the glass for sealing is sufficiently compressed by a metal stem is not achieved, and it becomes difficult to maintain sealing strength. Meanwhile, when the thermal expansion coefficient is too low, after the production of the hermetic terminal, a state in which the glass for sealing is excessively pulled by a metal pin is achieved, and cracks are liable to occur in the glass for sealing at an interface with the metal pin. The "thermal expansion coefficient" refers to an average linear thermal expansion coefficient measured with a push-rod-type thermal expansion coefficient measurement apparatus (TMA) in a temperature range of from 30° C. to 380° C.

In order to subject the glass for sealing to an appropriate compression stress after the production of the hermetic terminal, it is preferred that the shrinkage amount of the glass for sealing be smaller than the shrinkage amount of the metal stem and be larger than the shrinkage amount of the metal pin in a bonding temperature range. That is, the glass for sealing of the present invention has a thermal expansion coefficient in a temperature range of from 30° C. to a bonding temperature of preferably from $100\times10^{-7}$/° C. to $150\times10^{-7}$/° C., more preferably from $125\times10^{-7}$/° C. to $135\times10^{-7}$/° C. The "bonding temperature" refers to a temperature calculated by the expression Tf−(Tf−Tg)/3 when a glass transition point is defined as Tg (° C.) and a deformation point is defined as Tf (° C.) in a thermal expansion curve measured with TMA.

The glass for sealing of the present invention has a bonding temperature of preferably 585° C. or less, more preferably 550° C. or less, still more preferably from 480° C. to 535° C., particularly preferably from 500° C. to 525° C. When the bonding temperature is too high, a residual stress generated after the cooling is increased, with the result that the probability of the hermetic leakage is liable to be increased.

The glass for sealing of the present invention preferably has a granular form. With this, a green compact having a predetermined shape, particularly a green compact having a through-hole for inserting a metal pin can be easily produced through tablet molding.

The glass for sealing of the present invention preferably comprises a sintered compact. With this, when the glass for sealing having inserted therein a metal pin is housed in a metal stem, chipping of the glass for sealing can be suppressed.

The sintered compact has a sealing density of preferably 82% or more, 85% or more, 88% or more, or 92% or more, particularly preferably from 95% to 99%. The sealing density of the sintered compact reflects the ratio of bubbles in the sintered compact. As the sealing density becomes smaller, the ratio of bubbles in the sintered compact becomes larger, and a sealing defect is more liable to occur. Herein, the "sealing density" refers to a value calculated by the expression {(density of a sintered compact)/(density of a glass bulk without bubbles)}×100.

EXAMPLES

Now, the present invention is described by way of Examples. The following Examples are merely illustrative. The present invention is by no means limited to the following Examples.

Examples (Sample Nos. 1 to 3) and Comparative Examples (Sample Nos. 4 to 6) of the Present Invention are Shown in Table 1

TABLE 1

| | | No. 1 | No. 2 | No. 3 | No. 4 | No. 5 | No. 6 |
|---|---|---|---|---|---|---|---|
| Glass composition (mol %) | $SiO_2$ | 66.5 | 77.0 | 71.5 | 69.6 | 63.1 | 66.7 |
| | $B_2O_3$ | 4.5 | 0.5 | 2.5 | 7.2 | 5.0 | 3.8 |
| | $Al_2O_3$ | 2.5 | 2.5 | 2.5 | 1.2 | 3.4 | 2.0 |
| | $Li_2O$ | 4.5 | 1.0 | 3.0 | 4.6 | 0.0 | 4.7 |
| | $Na_2O$ | 8.0 | 8.0 | 6.0 | 7.0 | 12.6 | 9.1 |
| | $K_2O$ | 3.5 | 5.5 | 6.0 | 3.9 | 3.6 | 5.0 |
| | MgO | 0.0 | 0.0 | 0.0 | 0.0 | 0.0 | 0.0 |
| | CaO | 1.5 | 1.0 | 5.0 | 0.0 | 1.7 | 2.4 |
| | SrO | 0.0 | 0.0 | 0.0 | 0.0 | 2.7 | 0.1 |
| | BaO | 6.5 | 4.0 | 3.0 | 4.9 | 0.2 | 4.8 |
| | $TiO_2$ | 1.0 | 0.0 | 0.0 | 0.0 | 5.5 | 0.0 |
| | $ZrO_2$ | 0.5 | 0.0 | 0.0 | 0.6 | 0.0 | 0.6 |
| | $MnO_2$ | 0.0 | 0.0 | 0.0 | 0.0 | 1.3 | 0.0 |
| | $Cr_2O_3$ | 0.0 | 0.0 | 0.0 | 0.0 | 0.1 | 0.0 |
| | $Fe_2O_3$ | 0.0 | 0.0 | 0.0 | 0.0 | 0.4 | 0.0 |
| | $Co_2O_3$ | 0.0 | 0.0 | 0.0 | 0.0 | 0.4 | 0.0 |
| | F | 1.0 | 0.5 | 0.5 | 0.9 | 0.0 | 0.7 |
| $Li_2O + Na_2O + K_2O$ | | 16.0 | 14.5 | 15.0 | 15.6 | 16.2 | 18.8 |
| MgO + CaO + SrO + BaO | | 8.0 | 5.0 | 8.0 | 4.9 | 4.6 | 7.4 |
| $SiO_2/B_2O_3$ | | 14.8 | 154.0 | 28.6 | 9.7 | 12.6 | 17.5 |
| Ca/(MgO + CaO + SrO + BaO) | | 0.2 | 0.2 | 0.6 | 0.0 | 0.4 | 0.3 |
| $Li_2O + Na_2O + K_2O +$ MgO + CaO + SrO + BaO | | 24.0 | 19.5 | 23.0 | 20.5 | 20.7 | 26.2 |
| $\alpha_{30\text{-}Tset}$ ($\times 10^{-7}$) | | 132 | 126 | 130 | 137 | 143 | 138 |
| $\Delta\alpha_{Tg}$ ($\times 10^{-7}$/° C.) | | 12 | 6 | 11 | 16 | 19 | 19 |

First, a glass batch obtained by blending glass raw materials so as to give the glass composition shown in Table 1 was loaded in a platinum crucible, and melted at 1,500° C. for 4 hours. At the time of the melting, the glass batch was stirred with a platinum stirrer to be homogenized. Next, the resultant molten glass was poured on a carbon sheet, formed into a sheet shape, and annealed at a rate of 3° C./min from a temperature higher than an annealing point by about 20° C. to normal temperature. The resultant glass samples were each evaluated for various characteristics.

$\alpha_{30\text{-}Tset}$ is an average linear thermal expansion coefficient measured with TMA in a temperature range of from 30° C. to a bonding temperature. The "bonding temperature" refers to a temperature calculated by the expression Tf−(Tf−Tg)/3 when a glass transition point is defined as Tg (° C.) and a deformation point is defined as Tf (° C.) in a thermal expansion curve measured with TMA.

$\Delta\alpha_{Tg}$ is a value obtained by superimposing the thermal expansion curve of a metal stem and the thermal expansion curve of a glass sample on each other with a bonding temperature as a starting point and then evaluating a difference in thermal expansion between the metal stem and the glass sample at the glass transition point (deformation point) of the glass sample. From the viewpoint of preventing cracks from occurring in the glass for sealing owing to a tensile stress, the is preferably 15×10$^{-7}$/° C. or less.

A sealing density is a value calculated by the expression {(density of a sintered compact)/(density of a glass bulk after forming)}×100. A larger sealing density means that a sintered compact has less bubbles. The sintered compact is obtained by pulverizing and classifying the glass after forming so as to have an average particle diameter $D_{50}$ of from 25 μm to 30 μm, and then granulating the resultant glass powder, followed by firing at a temperature of (the softening point of the glass powder±30° C.) for 10 minutes.

Figure 2:
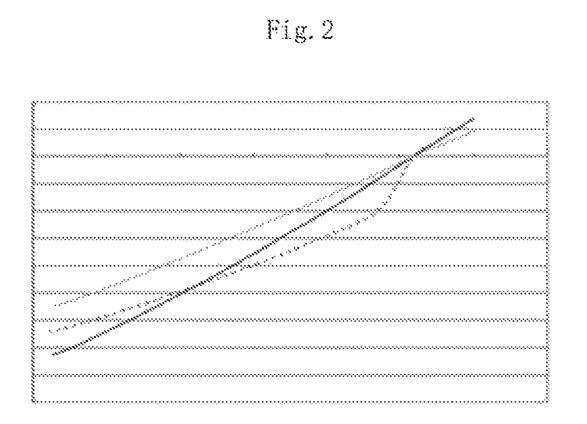
FIG. 2 is a graph for showing data in which the thermal expansion curve of Sample No. 1 in the "Examples" section, the thermal expansion curve of a metal stem, and the thermal expansion curve of a metal pin are superimposed on one another with a bonding temperature as a starting point.
Figure 3:
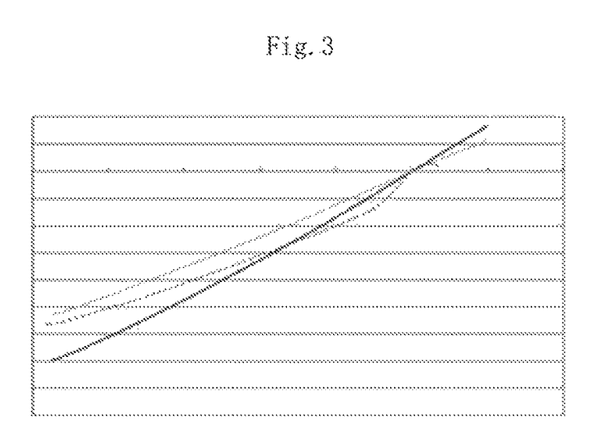
FIG. 3 is a graph for showing data in which the thermal expansion curve of Sample No. 2 in the "Examples" section, the thermal expansion curve of the metal stem, and the thermal expansion curve of the metal pin are superimposed on one another with a bonding temperature as a starting point.
Figure 4:
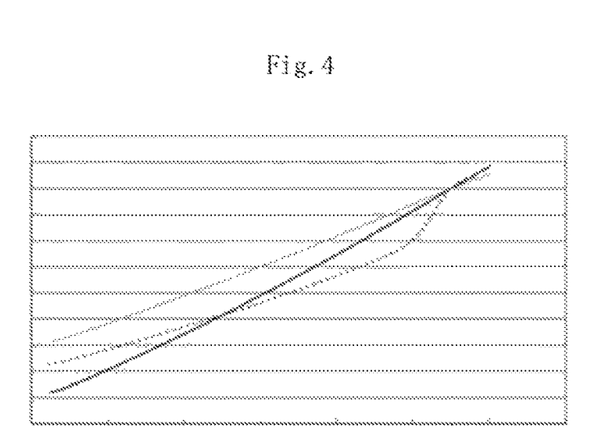
FIG. 4 is a graph for showing data in which the thermal expansion curve of Sample No. 3 in the "Examples" section, the thermal expansion curve of the metal stem, and the thermal expansion curve of the metal pin are superimposed on one another with a bonding temperature as a starting point.
Figure 5:
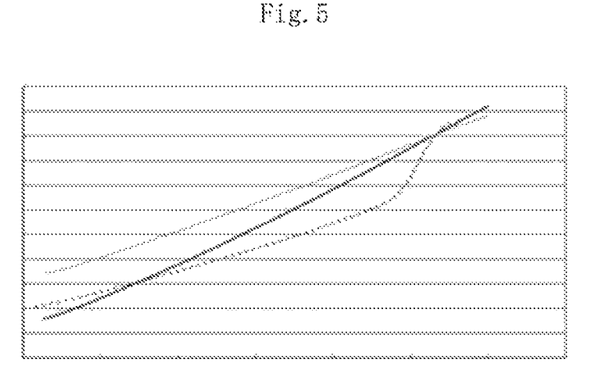
FIG. 5 is a graph for showing data in which the thermal expansion curve of Sample No. 4 in the "Examples" section, the thermal expansion curve of the metal stem, and the thermal expansion curve of the metal pin are superimposed on one another with a bonding temperature as a starting point.
Figure 6:
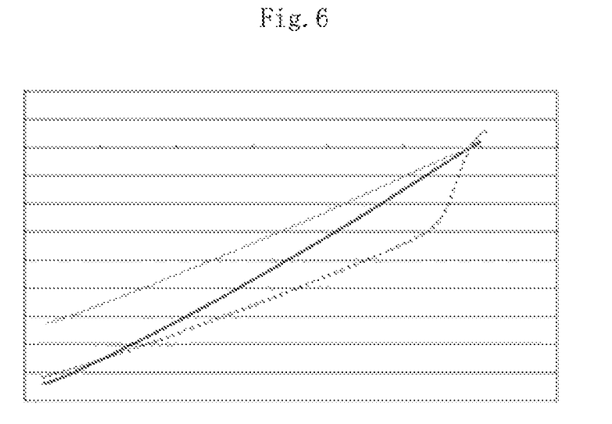
FIG. 6 is a graph for showing data in which the thermal expansion curve of Sample No. 5 in the "Examples" section, the thermal expansion curve of the metal stem, and the thermal expansion curve of the metal pin are superimposed on one another with a bonding temperature as a starting point.

FIG. 2 is a graph for showing data in which the thermal expansion curve of Sample No. 1, the thermal expansion curve of a metal stem, and the thermal expansion curve of a metal pin are super imposed on one another With a bonding temperature as a starting point. FIG. 3 is a graph for showing data in which the thermal expansion curve of Sample No. 2, the thermal expansion curve of the metal stem, and the thermal expansion curve of the metal pin axe superimposed on one another with a bonding temperature as a starting point. FIG. 4 is a graph for showing data in which the thermal expansion curve of Sample No. 3, the thermal expansion curve of the metal stem, and the thermal expansion curve of the metal pin are superimposed on one another with a bonding temperature as a starting point. FIG. 5 is a graph for showing data in which the thermal expansion curve of Sample No. 4, the thermal expansion curve of the metal stem, and the thermal expansion curve of the metal pin are superimposed on one another with a bonding temperature as a starting point. FIG. 6 is a graph for showing data in which the thermal expansion curve of Sample No. 5, the thermal expansion curve of the metal stem, and the thermal expansion curve of the metal pin are superimposed on one another with a bonding temperature as a starting point. In each of FIG. 2 to FIG. 6, solid lines represent the thermal expansion curves of the metal stem (thermal expansion coefficient: 150×10$^{-7}$/° C.) and the metal pin (thermal expansion coefficient: 110×10$^{-7}$/° C.), and a broken line represents the thermal expansion curve of the glass sample.

As is apparent from Table 1 and FIG. 2 to FIG. 6, a difference in thermal expansion between each of Sample Nos. 1 to 3 and the metal stem was small at a temperature around the glass transition point. Meanwhile, a difference in thermal expansion between each of Sample Nos. 4 to 6 and the metal stem was large at a temperature around the glass transition point. Therefore, when a hermetic terminal is produced through use of each of Sample Nos. 4 to 6, it is considered that cracks may occur owing to a temporal tensile stress.

REFERENCE SIGNS LIST 1 hermetic terminal
11 metal stem 12 metal pin
13 glass for sealing

The invention claimed is:

1. A glass for sealing, comprising as a glass composition, in terms of mol %, 60% to 80% of $SiO_2$, 2% to 5.8% of $B_2O_3$, 12% to 18.7% of $Li_2O+Na_2O+K_2O$, and 2% to 12% of $MgO+CaO+SrO+BaO$, and 0.1% to 2% of F, and having a molar ratio $SiO_2/B_2O_3$ of 14 or more.

2. The glass for sealing according to claim 1, wherein the glass for sealing has a content of $MgO+CaO+SrO+BaO$ of from 4 mol % to 10 mol %.

3. The glass for sealing according to claim 1, wherein the glass for sealing has a content of $Li_2O+Na_2O+K_2O$ of 18 mol % or less and has a molar ratio $CaO/(MgO+CaO+SrO+BaO)$ of 0.2 or more.

4. The glass for sealing according to claim 1, wherein the glass for sealing has a content of $Li_2O+Na_2O+K_2O+MgO+CaO+SrO+BaO$ of 25 mol % or less.

5. The glass for sealing according to claim 1, wherein the glass for sealing has a granular form.

6. The glass for sealing according to claim 1, wherein the glass for sealing comprises a sintered compact,
   wherein the sintered compact is formed by heating a green compact, and
   wherein the green compact is produced by tablet molding granules.

7. The glass for sealing according to claim 1, wherein the glass for sealing is used for sealing a hermetic terminal.

* * * * *